United States Patent [19]

Minami et al.

[11] 4,027,244

[45] May 31, 1977

[54] REMOTE CONTROL SIGNAL TRANSMITTER INCLUDING VARIABLE RESISTOR WITH SWITCHING MEANS

[75] Inventors: Shunji Minami, Moriguchi; Takehide Takemura; Shunzo Oka, both of Hirakata, all of Japan

[73] Assignee: Matsushita Electric Industrial Co., Ltd., Osaka, Japan

[22] Filed: June 27, 1975

[21] Appl. No.: 590,931

Related U.S. Application Data

[62] Division of Ser. No. 449,758, March 11, 1974, Pat. No. 3,916,369.

[30] Foreign Application Priority Data

Mar. 14, 1973 Japan .............................. 48-30390
Mar. 14, 1973 Japan .............................. 48-30391
May 30, 1973 Japan .............................. 48-61300
Mar. 10, 1973 Japan ......................... 48-29974[U]

[52] U.S. Cl. ................................ 325/118; 358/194; 325/142; 325/152; 325/164; 325/186; 338/172; 338/200

[51] Int. Cl.[2] ........................................... H04B 1/04

[58] Field of Search ............ 325/37, 111, 118, 131, 325/144, 152, 161, 164, 168, 169, 183, 142, 28, 186; 178/DIG. 15; 331/177 R, 182; 179/82

[56] References Cited

UNITED STATES PATENTS

| | | | |
|---|---|---|---|
| 2,433,782 | 12/1947 | Murdoch, Jr. | 325/164 |
| 3,289,001 | 11/1966 | Wilcox | 325/37 |
| 3,488,632 | 1/1970 | Clark | 179/82 |
| 3,678,392 | 7/1972 | Houghton | 178/DIG. 15 |
| 3,928,760 | 12/1975 | Isoda | 178/DIG. 15 |

*Primary Examiner*—Robert L. Griffin
*Assistant Examiner*—Marc E. Bookbinder
*Attorney, Agent, or Firm*—Stevens, Davis, Miller & Mosher

[57] ABSTRACT

A remote control system including a variable resistor with switching means the variable resistor unit comprises a variable resistor and a switching means, said switching means being interlocked to said variable resistor such that said switching means is operated only when it is desired to adjust the variable resistor. With this variable resistor with switching means the operation of the switching means and adjustment of the variable resistor for volume control or the like can be effected through a single operation.

4 Claims, 14 Drawing Figures

REMOTE CONTROL SIGNAL TRANSMITTER INCLUDING VARIABLE RESISTOR WITH SWITCHING MEANS

This is a Division of application of Ser. No. 449,758 filed Mar. 11, 1974, now U.S. Pat. No. 3,916,369.

This invention relates to in a novel variable resistor with switching means, which variable resistor can be coupled to or decoupled from an external circuit for adjustment electrically and adjusted at the same time through a single operation.

Where a variable resistor is used such that it is coupled to or decoupled from an external circuit provided together with it in a casing or the like only when it is desired to be adjusted, for instance where the variable resistor is coupled to the external circuit for the adjustment of the resistance only when a power source is supplied to the circuit, a switch has commonly been provided separately from the variable resistor. In this case, the switch is first operated to couple the variable resistor, and then the variable resistor is adjusted. With this construction, the separately provided switch adds to the number of component parts, also it has to be operated prior to the adjustment of the variable resistor. Further, while the variable resistor in a remote control system or the like usually need be coupled to the external circuit only when a power source is supplied to the circuit, in the aforementioned case the power source battery is prone to wasteful consumption if the switch is left "on" after the adjustment of the variable resistor.

The present invention has an object of precluding the above prior art drawbacks by the provision of a novel variable resistor with switching means, with which the operation of the switching means and adjustment of the variable resistor for volume control or the like can be effected through a single operation.

A feature of the variable resistor with switching means according to the invention is that the switching operation and adjustment of the resistance for volume control or the like can be effected through a single operation. That is, the electrical coupling or decoupling of the variable resistor to or from the external circuit is effected by depressing or releasing a manual knob while effecting volume control or the like by turning the knob while it is in its depressed state. Thus, it is particularly suitable for use as a variable resistor for a remote control system or the like for remote control of, for instance, the volume of a television receiver. In this application the invention permits the coupling of a power source to an oscillator in the transmitter and adjustment of the variable resistor for the volume control to be effected through a single operation. Also, it eliminates the possibility of wasteful consumption of power that might result with the prior art remote control system due to leaving the switch on after the variable resistor is adjusted. Thus, it is very worthwhile in practice.

The aforementioned and other objects, features and advantages of the invention will become more apparent from the following description taken in conjunction with the accompanying drawings, in which.

Figure 7A:
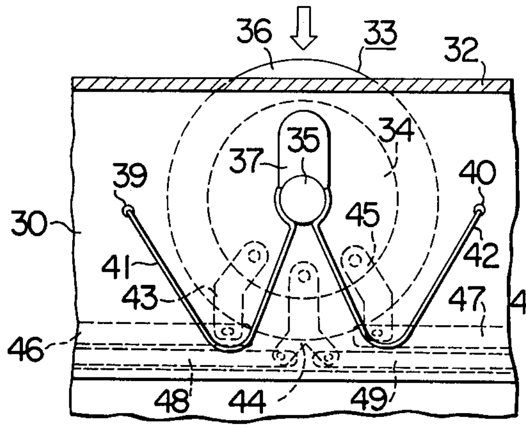
Figure 7B:
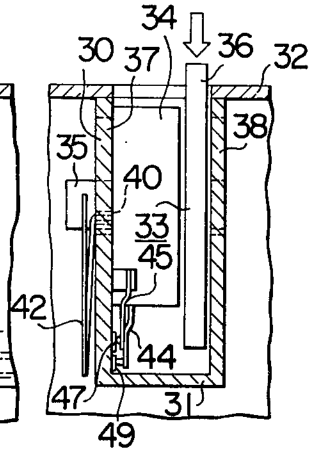
Figure 8:
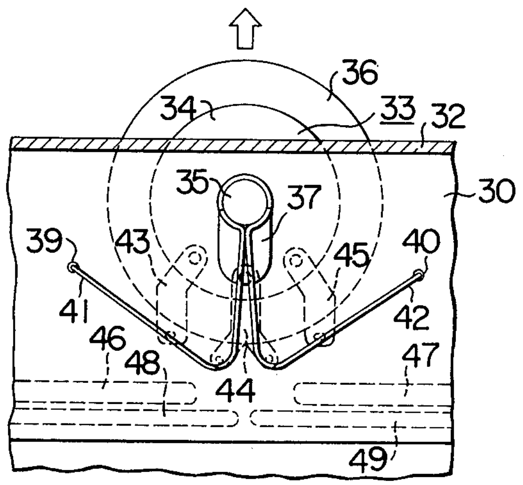
Figure 9A:
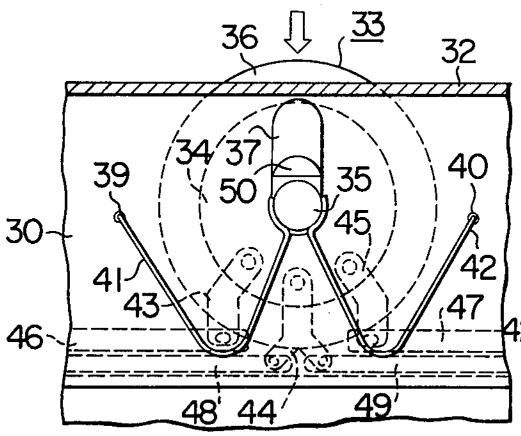
Figure 9B:
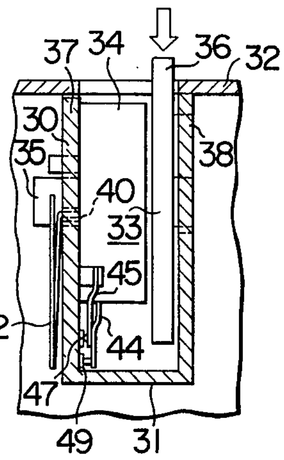
Figure 10:
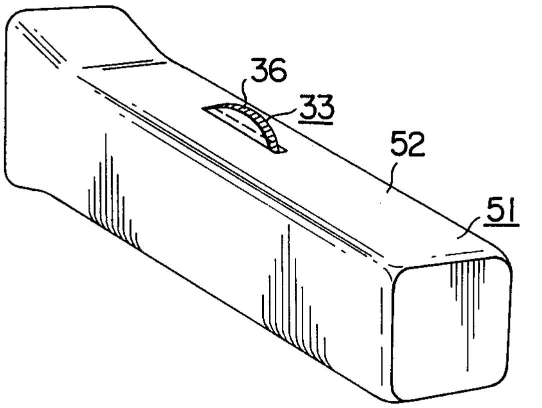
Figure 11:
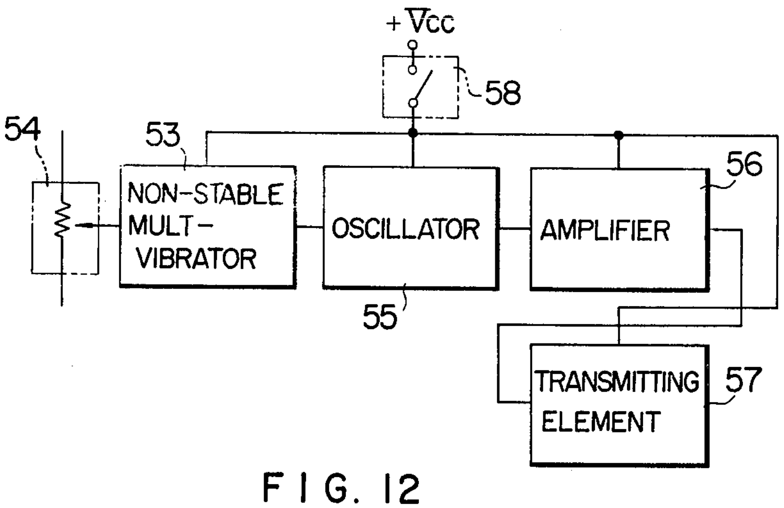
Figure 12:
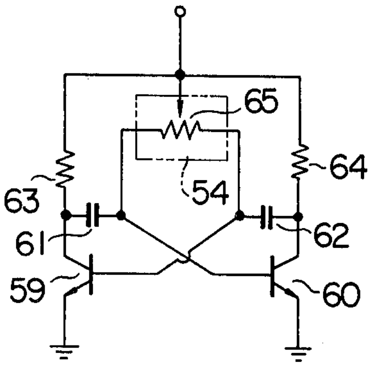

FIGS. 7*a* and 7*b* show, in fragmentary front and side sections, a further embodiment of the invention, in the state with the variable resistor held depressed;

FIG. 8 is a view similar to FIG. 7*a* but showing the same embodiment with the variable resistor in the non-depressed state;

FIGS. 9*a* and 9*b* are views similar to FIGS. 7*a* and 7*b* but showing a modification;

FIG. 10 is a perspective view showing a remote control signal transmitter using the variable resistor with switching means according to the invention;

FIG. 11 is a block form diagram outlining the circuit of the same remote control signal transmitter; and FIG. 12 is a circuit diagram showing a non-stable multi-vibrator in the same remote control signal transmitter.

Figure 1:
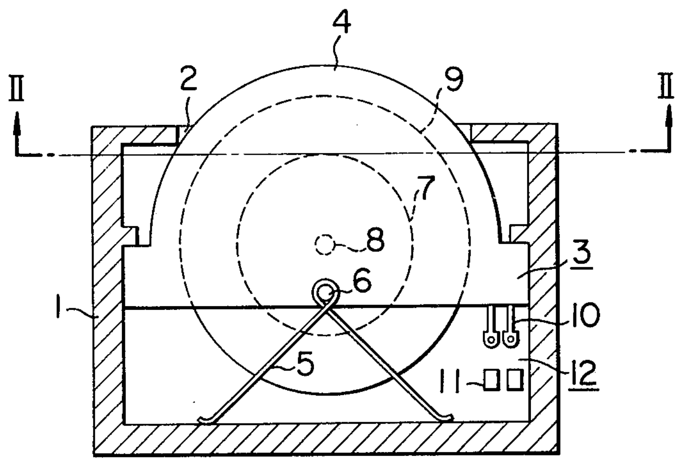
FIG. 1 is a sectional view of an embodiment of the variable resistor with switching means according to the invention.
Figure 2:
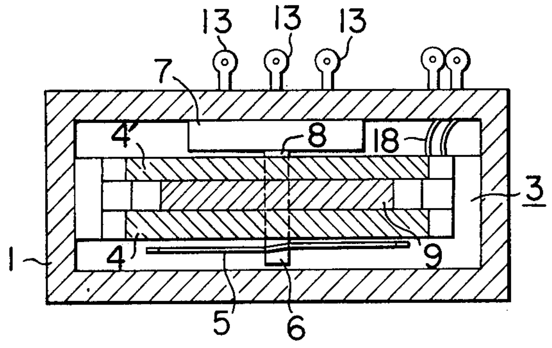
FIG. 2 is a section taken along line II—II in FIG. 1.
Figure 3:
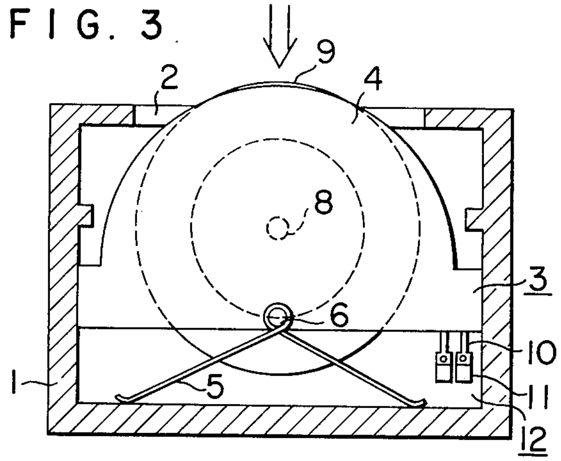
FIG. 3 is a view similar to FIG. 1 but showing the same embodiment in the operative state.

Referring to FIGS. 1 to 3, numeral 1 designates a case having a rectangular top opening 2. Movably supported within the case 1 is a drive member 3 having two arcular side walls 4 and 4' parallel to each other. A spring member 5 is supported by a protuberance 6 outwardly projecting from one side wall of the drive member 3. The drive member 3 is always urged upwardly by the spring member 5, and it normally assumes a position as shown in FIG. 1, with the arcular side walls 4 and 4' of the drive member 3 partly projecting through the rectangular opening 2 of the case 1. Numeral 7 designates a variable resistor provided within the case 1. The variable resistor 7 is integrally tied through a rotative shaft 8 to a manual knob 9, which is interposed between the arcular side walls 4 and 4'. Numeral 10 designates movable contacts provided on the drive member 3, and numeral 11 fixed contacts provided on the case 1. The movable contacts 10 and fixed contacts 11 constitute a switch as generally indicated at 12. Numeral 13 in FIG. 2 designates the terminals of the variable resistor 7.

With this construction, when the drive member 3 is forced in the downward direction against the spring force of the spring member 5, it is downwardly displaced from its position shown in FIG. 1 to the position shown in FIG. 3, whereby the knob 9 partly projects from between the arcular side walls 4 and 4' of the drive member 3. With the lowering of the drive member 3 the movable contacts 10 are also lowered in unison and contacted with the fixed contacts 11, thus closing the switch 12 in the state of FIG. 3. In the state of FIG. 3, that is, with the drive member 3 held downwardly depressed, by turning the knob 9 the resistance of the variable resistor 7 may be varied. In this way, the operation of the switch and adjustment of the variable resistor can be effected through a single operation.

Figure 4:
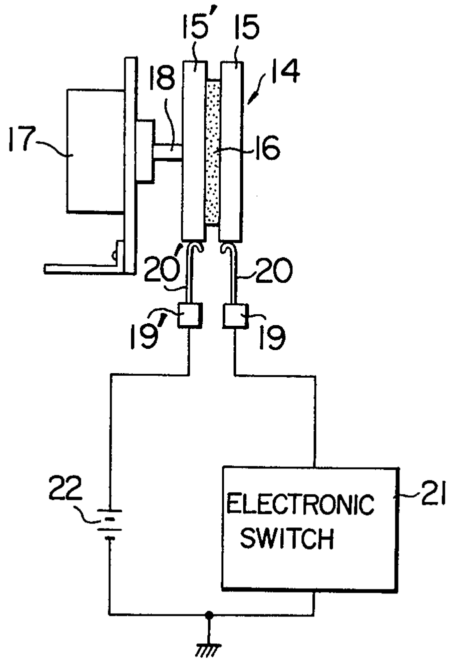
FIG. 4 is a schematic representation of another embodiment of the invention.
Figure 5:
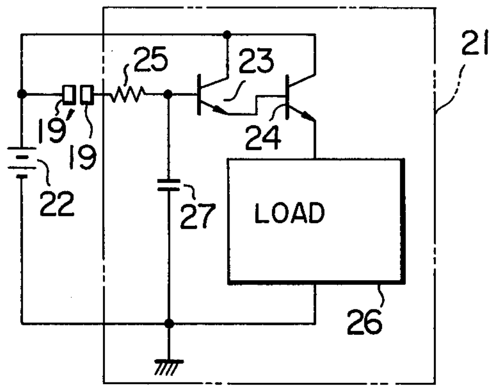
FIGS. 5 and 6 are connection diagrams of electronic switches used in accordance with the invention.

A second embodiment of the invention will now be described in connection with FIGS. 4 to 6. Referring to FIG. 4, numeral 14 designates a manual knob for the variable resistor. It consists of two conductive discs 15 and 15' joined together through an insulator 16. Numeral 17 designates a variable resistor, which is integrally coupled through a rotative shaft 18 to the knob 14. The conductive discs 15 and 15' are in frictional contact with respective brushes 20 and 20' connected to respective terminals 19 and 19', between which an electronic circuit switch 21 and a power supply 22 are connected. FIG. 5 shows an example of the electronic circuit switch 21. It comprises an amplifying transistor 23 and a switching transistor 24. The aforesaid terminals 19 and 19' are adapted to be connected through an input resistor 25 to the base of the amplifying transistor 23, and a load 26 is connected to the emitter of the switching transistor 24. Numeral 27 designates a capacitor for charging and discharging.

In operation, when the knob 14 is touched by a hand, the conductive discs 15 and 15' are short-circuited to each other, so that the terminals 19 and 19' are short-circuited to each other through the brushes 20 and 20'. As a result, current is caused to pass from the power supply 22 through the input resistor 25 to the base of the amplifying transistor 23. With the base current supplied to the amplifying transistor 23, it provides amplified output current to the base of the switching transistor 24 to trigger the same, thus rendering on the load 26 connected to the emitter of the switching transistor 24. In this state, the variable resistor 17 may be adjusted to a desired resistance by manipulating the knob 14. By releasing the hand off the knob 14 after manipulating it, the load 26 can be automatically rendered "off". The input resistor 25 has a sufficiently large resistance compared to the resistance offered by the hand to ensure steady and stable operation irrespective of the fluctuations of the resistance offered by the hand.

Figure 6:
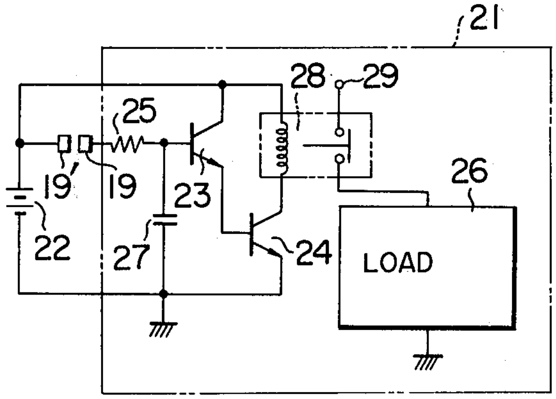

FIG. 6 shows another example of the electronic circuit switch. This example has an electromagnetic relay 28 connected to switching transistor 24 such that a d-c or a-c power source 29 may be coupled to load 26 through the electromagnetic relay 28. It may be applied to a load consuming high power.

A further embodiment of the invention will be described in connection with FIGS. 7*a*, 7*b*, 8, 9*a* and 9*b*. Referring to these Figures, designated at 30 and 31 is a chassis or frame secured to the casing 32 of a remote control transmitter or the like where a variable resistor provided with a switch is used. Numeral 33 designates a variable resistor mounted in the frame 30, 31. Its variable resistor element 34 is integrally tied through a rotative shaft 35 to an adjustment knob 36. The rotative shaft 35 of the variable resistor 33 penetrates vertically elongate openings or slots 37, 38 formed in opposite side walls of the frame 30, 31 so that it is vertically movable relative to the frame 30, 31. The rotative shaft 35 is upwardly urged by two V-shaped springs 41 and 42 arranged in the form of the letter W, with the two V-shaped springs 41 and 42 having their one end loosely or rotatably fitted in respective holes 39 and 40 formed in one side wall of the frame 30, 31 and their other end engaging with the rotative shaft 35 on the lower side thereof. Thus, when the knob 36 is downwardly depressed from the outside of the casing 32, for instance by a finger, it is lowered against the spring force of the springs 41 and 42 to a position as shown in FIGS. 7*a* and 7*b*, while by removing the depressing force it is raised again by the restoring force of the springs 41 and 42 to its upper set position as shown in FIG. 8. If the holes 39 and 40 for supporting the springs 41 and 42 are provided at a position slightly below the lower set position of the rotative shaft 35, the rotative shaft 35 may be made to experience a strong biasing force of the springs 41 and 42 when it is at its upper set position and a weak biasing force at its lower set position. If this is done, a good sense of touch may thus be obtained at the time of lowering the variable resistor 33. However, this configuration of the spring arrangement is by no means limitative, and it is possible as well to use only a single V-shaped spring or a W-shaped spring or use any other spring or flexible member having any other suitable configuration.

The variable resistor 33 is provided with brush terminals 43, 44 and 45 for connecting the resistive body and slide tap of the resistor element 34 to the external circuit, these brush terminals 43, 44 and 45 being vertically movable along the inner wall of the frame 31 in unison with the variable resistor 33. The frame 31 is provided on its inner wall with terminals 46, 47, 48 and 49 made of printed metal foil, which are adapted to be contacted by the brush terminals 43, 44 and 45 with the lowering thereof, that is, with the lowering of the variable resistor 33. The terminal 46 is connected to one terminal of an adjustable circuit in a remote control transmitter circuit, the terminal 47 to the other terminal of the adjustable circuit, the terminal 48 to a battery, and the terminal 49 to a power supply line of the circuit.

With the above construction, the variable resistor 33 is normally in its upper set position. In this position, it is isolated from the external circuit since the brush terminals 43, 44 and 45 are separated from the printed foil terminals 46, 47, 48 and 49.

At the time of operation, the variable resistor 33 is depressed by means of a finger to bring the brush terminals 43 to 45 into contact with the associated terminals 46 to 49, whereby the variable resistor 33 is connected to the external circuit. In this state, the external resistor 33 can be adjusted by turning the adjustment knob 36. At this time, a turn check piece 50 may be conveniently inserted in the slot 37 formed in one side wall of the frame 30, 31 to prevent the turning of the variable resistor element 34 from its locked position.

Again with this embodiment, the switching operation and adjustment of resistance can be effected through a single operation, with the electrically coupling or decoupling of the variable resistor 33 effected by depressing or releasing the knob 36 and the adjustment of the resistance effected by turning the knob 36. In this way, the variable resistor 33 can be connected to the external circuit only at the time of adjusting it.

While in the preceding embodiment the variable resistor 33 is adapted to be electrically coupled to the external circuit by depressing the knob 36, it is also possible to construct the device such that the variable resistor may be electrically decoupled by depressing the knob. As a further modification, it is possible to construct the device such that by depressing the knob the variable resistor is electrically coupled to a separate circuit, and to this end two different terminals may be provided on the side of the frame 30.

The variable resistor provided with a switch as described above may be applied, for instance, to a remote control transmitter 51, as shown in FIG. 10, such that only when the knob, i.e., knob 36 in case of the variable resistor 33 of the third embodiment, is depressed into a casing 52 the transmitter circuit is operative to send out, for instance, a remote control light signal for controlling the volume of a television receiver and that by adjusting the variable resistor 33 the modulation content of the light signal can be adjusted to obtain volume control. In other words, with the variable resistor provided with a switch according to the invention it is possible to provide a remote control transmitter for remote controlling the volume of a television receiver by varying the duty of the transmitted signal through adjustment of the variable resistor at hand.

FIG. 11 outlines an example of such remote control transmitter as mentioned above. In the FIG., numeral 53 designates a non-stable multi-vibrator, the duty of which is made variable through the variable resistor 54. Numeral 55 designates an oscillator, numeral 56 an amplifier, and numeral 57 a transmitting element for transmitting light, sound, electromagnetic wave or magnetic field. The output signal of the oscillator 55 is varied according to the duty of the non-stable multi-vibrator 53. The transmitting element 57 may, for instance, be a light emitting diode. Numeral 58 designates a switch for electrically coupling and decoupling voltage to the non-stable multi-vibrator 53, oscillator 55, amplifier 56 and transmitting element 57.

FIG. 12 shows the connection between non-stable multi-vibrator 53 and variable resistor 54 shown in FIG. 11. In FIG. 12, numerals 59 and 60 designate transistors constituting the non-stable multi-vibrator, numerals 61 and 62 capacitors, and numerals 63 and 64 resistors. The variable resistor 54 has its opposite ends connected to the bases of the respective transistors 59 and 60, and the duty of the non-stable multi-vibrator 53 can be adjusted by moving a brush tap 65 of the variable resistor 54.

In the circuit of FIG. 11, by closing the switch 58 the oscillation is started, and by varying the variable resistor 54 the duty of the transmitted signal is varied, the variation of duty being detected by a receiver provided in a television receiver to invoke a corresponding change of volume.

The application or the previous embodiments of the variable resistor with a switch to the remote control transmitter of FIG. 11 will now be considered.

In the case of the first embodiment of FIGS. 1 to 3, the variable resistor 7 is used for the variable resistor 54 in FIG. 11, and the switch 12 constituted by the movable contacts 10 and fixed contacts 11 is used for the switch 58 in FIG. 11. Then, in the closed state of the switch 12 (corresponding to switch 58) a voltage ($+V_{cc}$) is supplied to the non-stable multi-vibrator 53, oscillator 55, amplifier 56 and transmitting element 57 to transmit a signal. Also, in the state shown in FIG. 3, with the drive member 3 held depressed with a downward force applied thereto, by turning the knob 9 the brush 55 shown in the circuit of FIG. 12 is moved to vary the duty of the transmitted signal. On the television receiver side, this change of duty is detected to invoke a corresponding change of volume or the like.

Similar to the first embodiment, the third embodiment of FIGS. 7 to 9 can be applied to the remote control transmitter as well.

In the case of the second embodiment of FIGS. 4 to 6, by touching the conductive discs 15 and 15' with a hand the switch is turned on to supply voltage ($+V_{cc}$) to the non-stable multi-vibrator 53, oscillator 55, amplifier 56 and transmitting element 57 in FIG. 11, so that the transmitter starts transmission of a signal. In other words, by touching the knob 14 of the variable resistor 17 with the hand the transmitter is operated, and by turning the knob 14 the resistance of the variable resistor is varied to vary the duty of the non-stable multi-vibrator 53 in FIG. 11, whereby the volume of the television receiver may be adjusted as mentioned above.

While the application of the embodiments is concerned with varying the volume or the like of a television receiver through variation of the duty of a transmitted signal caused by varying the variable resistor, it is also possible to permit variation of the volume or the like through variation of the amplitude or frequency of the transmitted signal by varying the variable resistor, and in this case the oscillator may be suitably modified to suit the mode of operation.

What we claim is:

1. A remote control signal transmitter comprising:

a variable resistor unit including a variable resistor and switching means;

non-stable multi-vibrator circuit means connected to said variable resistor, the duty cycle of said multi-vibrator being variable according to the resistance variation of said variable resistor;

oscillator circuit means connected to said multi-vibrator circuit means, the duration of an output signal of said oscillator circuit means being variable according to the duty cycle of said multi-vibrator circuit means;

amplifier circuit means; and transmitting circuit means connected to said oscillator circuit means through said amplifier circuit means for transmitting a remote control signal, said switching means coupled to an electric energy source and interlocked with said variable resistor such that said switching means is operated to supply electric energy to for energizing said remote control transmitter only upon adjustment of said variable resistor.

2. A remote control signal transmitter according to claim 1, wherein said variable resistor unit comprises a drive member supported for movement in one direction or the opposite direction thereto, a flexible member urging said drive member in a predetermined direction, a manual knob secured to a rotative shaft of said variable resistor and adapted to project from said drive member when said drive member is moved with a force applied thereto against the restoring force of said flexible member, movable terminal means connected with said drive member, and fixed terminal means, said movable terminal means being capable of being contacted with and separated from said fixed terminal means provided on a case means, and wherein said oscillator produces said output signal when said movable terminal means is brought into contact with said fixed terminal means.

3. A remote control signal transmitter according to claim 1, wherein said variable resistor unit comprises a manual knob secured to a rotative shaft of said variable resistor, said manual knob being constituted by two conductive disc means and an insulator intervening therebetween and connected with said disc means, and an electronic switch connected to terminal means electrically connected to said conductive disc means, said electronic switch enabling supply of electric energy when said two conductive disc means are short-circuited to each other by means of a human hand, and wherein said oscillator produces said output signal when said electronic switch is operated.

4. A remote control signal transmitter according to claim 1, wherein said variable resistor unit comprises a case accommodating said variable resistor, said variable resistor consisting of a variable resistor element having a rotative shaft and a manual knob secured to said rotative shaft, movable terminal means provided on said variable resistor, said movable terminal means being movable in unison with said variable resistor, and fixed terminal means adapted to be contacted with or separated from said movable terminal means with movement of said variable resistor with respect to said case, and wherein said oscillator produces said output signal when said movable terminal means is brought into contact with said fixed terminal means.

* * * * *